United States Patent
Moon et al.

(10) Patent No.: US 8,806,380 B2
(45) Date of Patent: Aug. 12, 2014

(54) DIGITAL DEVICE AND USER INTERFACE CONTROL METHOD THEREOF

(75) Inventors: Min-jeong Moon, Seongnam-si (KR); Young-mi Kang, Yongin-si (KR); Young-sun Kim, Suwon-si (KR); Joon-kyu Seo, Seoul (KR); Yoon-ji Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 12/505,035

(22) Filed: Jul. 17, 2009

(65) Prior Publication Data
US 2010/0077353 A1    Mar. 25, 2010

(30) Foreign Application Priority Data
Sep. 24, 2008 (KR) .................... 10-2008-0093744

(51) Int. Cl.
*G06F 3/048* (2013.01)

(52) U.S. Cl.
USPC ............ 715/856; 715/786; 715/787; 715/860

(58) Field of Classification Search
USPC ........................................ 715/732, 786, 787
See application file for complete search history.

(56) References Cited

U.S. PATENT DOCUMENTS

| | | | | |
|---|---|---|---|---|
| 5,812,124 A * | 9/1998 | Eick et al. | ......................... | 725/45 |
| 6,262,722 B1 | 7/2001 | Allison et al. | | |
| 7,479,949 B2 * | 1/2009 | Jobs et al. | ...................... | 715/786 |
| 7,966,575 B1 * | 6/2011 | Jetha et al. | ..................... | 715/817 |
| 8,166,416 B2 * | 4/2012 | Mei et al. | ..................... | 715/786 |
| 8,631,344 B2 * | 1/2014 | Hama et al. | .................... | 715/786 |
| 2002/0109728 A1 * | 8/2002 | Tiongson et al. | ............. | 345/786 |
| 2002/0186252 A1 * | 12/2002 | Himmel et al. | ............... | 345/787 |
| 2005/0091604 A1 * | 4/2005 | Davis | ............................ | 715/787 |
| 2005/0210403 A1 * | 9/2005 | Satanek | ......................... | 715/786 |
| 2006/0184901 A1 * | 8/2006 | Dietz | ............................ | 715/787 |
| 2007/0143705 A1 * | 6/2007 | Peters | ........................... | 715/786 |
| 2008/0134033 A1 * | 6/2008 | Burns et al. | .................... | 715/705 |
| 2009/0144642 A1 * | 6/2009 | Crystal | ......................... | 715/764 |

FOREIGN PATENT DOCUMENTS

| | | | |
|---|---|---|---|
| JP | 2005-323395 A | 11/2005 | |
| JP | 2006018965 A | * | 1/2006 |
| WO | 9903271 | 1/1999 | |

* cited by examiner

*Primary Examiner* — Dino Kujundzic
(74) *Attorney, Agent, or Firm* — Sughrue Mion, PLLC

(57) ABSTRACT

A digital device and a UI control method thereof are provided. A user interface (UI) generator generates a UI, a controller controls the UI generator to generate a UI which includes a menu area to display a list of contents for a sub-category from one or more sub-categories and a scroll bar to display information on the respective sub-categories, and a display unit displays the generated UI.

18 Claims, 9 Drawing Sheets

DIGITAL DEVICE AND USER INTERFACE CONTROL METHOD THEREOF

CROSS-REFERENCE TO RELATED APPLICATIONS

This application claims priority from Korean Patent Application No. 10-2008-93744, filed on Sep. 24, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to a digital device and a user interface (UI) control method thereof, and more particularly, to a digital device which provides a scroll bar having an additional function and a UI control method thereof.

2. Description of the Related Art

Thanks to the development of communication technology and storage media, users are able to store a huge amount of contents on a digital device. As a large amount of contents is stored on the digital device, the user generally lists and replays only contents he/she wishes to enjoy.

However, in the case of a portable digital device, the screen size is small and the input method is restrictive, so users are inconvenienced when searching for their desired contents. For example, in order to browse desired contents from all contents stored on the digital device, the user must move a cursor block by block using a directional key or a touch screen, which is inconvenient to the user. Therefore, there is a demand for an environment that allows the user to list any amount of contents more effectively.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a digital device which is capable of browsing desired contents more rapidly through a scroll bar and adding various functions to the scroll bar, and a UI control method thereof.

According to an aspect of the present invention, there is provided a digital device, including a user interface (UI) generator which generates a UI; a controller which controls the UI generator to generate a UI which includes a menu area to display a list of a plurality of contents for each sub-category and a scroll bar to display information on the respective sub-categories, and a display unit which displays the generated UI.

The UI generator may divide the scroll bar to generate areas corresponding to the respective sub-categories, and then may display the information on the respective sub-categories on the corresponding areas.

The digital device may further include a storage unit which stores the plurality of contents, and the controller may classify the stored plurality of contents into the sub-categories and determine an amount of contents belonging to each sub-category, and the UI generator may change a size of each divided area based on the determined amount of contents.

The digital device may further include a user input unit which controls a moving direction of a cursor to select one of the divided areas, and the UI generator may display a list of contents belonging to the sub-category corresponding to the selected area on the menu area.

The cursor may be moved between the scroll bar and the menu area by the user input unit.

The UI generator may display on the scroll bar an indicator that indicates a relative position of the contents selected from the displayed list of contents.

The controller may identify the sub-category to which the selected contents belong, and the UI generator may display the indicator on an area of the scroll bar corresponding to the identified sub-category.

The UI generator may display all or a part of the divided areas of the scroll bar on the UI.

The scroll bar may be located on one of an upper end, a lower end, a left side and a right side of the menu area.

The contents may be at least one of a still picture, a music, a motion picture, and a text.

According to another aspect of the present invention, there is provided a method of controlling a user interface (UI) of a digital device, the method including displaying a list of a plurality of contents for each sub-category on a menu area of a UI, and displaying a scroll bar displaying information on the respective sub-categories on the UI.

The displaying of the scroll bar may divide the scroll bar to generate areas corresponding to the respective sub-categories, and then may display information on the respective sub-categories on the corresponding areas.

The method may further include storing the plurality of contents, and classifying the stored plurality of contents into the sub-categories and determining an amount of contents belonging to each sub-category, and the displaying of the scroll bar may change a size of each divided area based on the determined amount of contents.

The method may further include selecting one of the divided areas, and displaying a list of contents belonging to the sub-category corresponding to the selected area on the menu area.

The method may further include selecting one of the scroll bar and the menu area by using a cursor which is movable between the scroll bar and the menu area.

The method may further include displaying on the scroll bar an indicator that indicates a relative position of the contents selected from the list of contents displayed on the menu area.

The method may further include identifying a sub-category to which the selected contents belong, and the indicator may be displayed on an area of the scroll bar corresponding to the identified sub-category.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, the same drawing reference numerals are used for the same elements across all drawings. The matters defined in the description, such as the detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
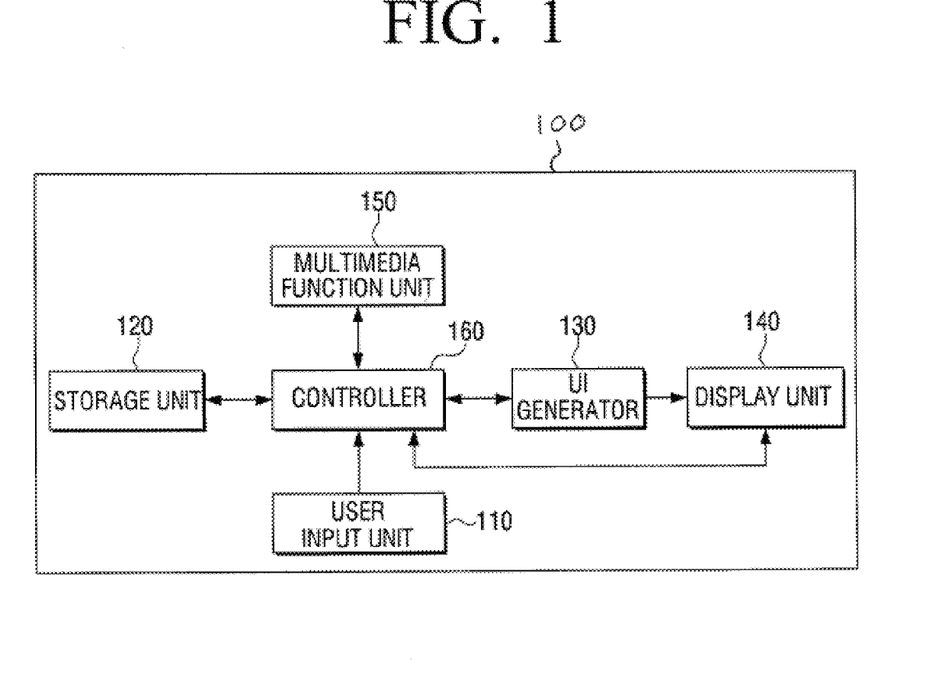
FIG. 1 is a block diagram illustrating a digital device according to an exemplary embodiment of the present invention.

FIG. 1 is a view illustrating a digital device according to an exemplary embodiment of the present invention.

Referring to FIG. 1, a digital device 100 according to an exemplary embodiment of the present invention comprises a user input unit 110, a storage unit 120, a UI generator 130, a display unit 140, a multimedia function unit 150, and a controller 160. The digital device 100 may be a consumer electronic (CE) device the input method of which is restricted, or a computer. The CE device may be a digital still camera, a digital video camera, an MP3 player, and a mobile terminal such as a cellular phone. The input method of this device is restricted because the CE device is controlled using a simple direction key such as a 5 way key.

The user input unit 110 comprises a plurality of function keys or a touch screen, and receive a user command from a user and transmits it to the controller 160.

Figure 2:
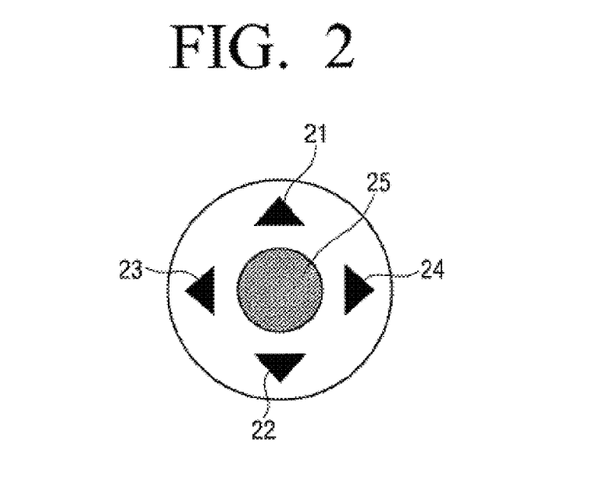
FIG. 2 is a view illustrating an example of the 5 way-key provided on a user input unit.

FIG. 2 is a view of the 5 way-key provided on the user input unit 110 by way of an example.

Referring to FIG. 2, the 5 way-key comprises an up button 21, a down button 22, a left button 23, a right button 24, and a selection button 25. In order to move the current cursor up one line, the user presses the up button 21 once, and in order to move the current cursor down one line, the user presses the down button 22 once. Also, if the selection button 25 is pressed, detailed information of the contents or category indicated by the current cursor is displayed on a menu area, which will be described in detail below.

Also, the user selects his/her desired contents or category by touching or dragging on a touch screen (not shown).

The storage unit 120 stores various programs required to operate the digital device 100, for example, a program or data required to generate a UI. Also, the storage unit 120 stores a plurality of contents. The contents include multimedia data, for example, a still image file, a motion picture file, a music file, and a text file, and also may be any kind of files that are provided to the user. The contents stored in the storage unit 120 include attribute information of the contents. If the contents are a music file, the attribute information includes artist, title, mood, genre, and album. Also, the storage unit 120 stores categories classified by the attribute of the contents and sub-categories of each category.

Figure 3:
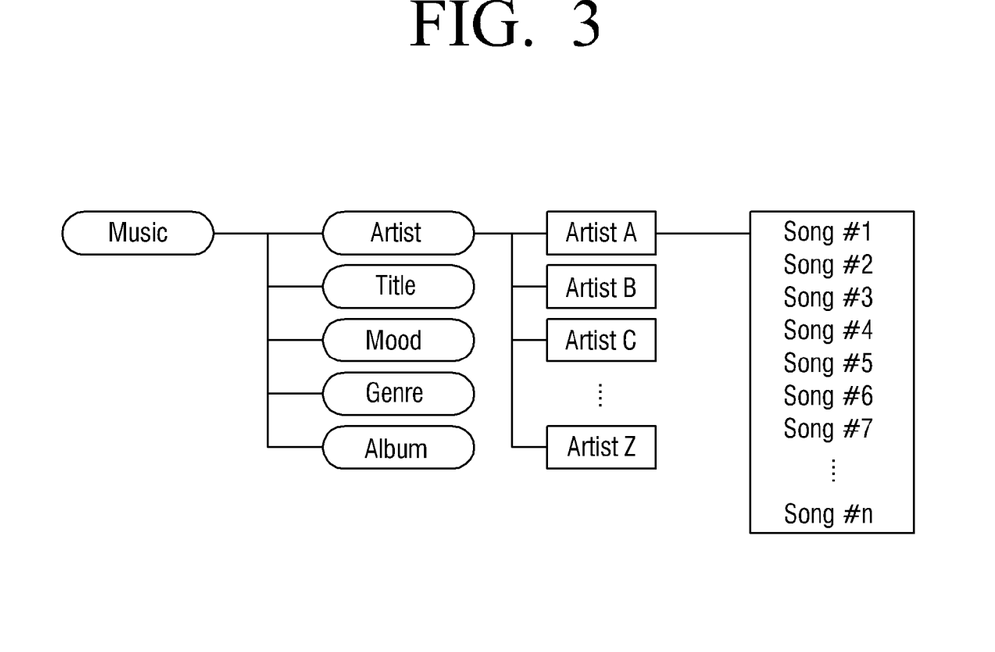
FIG. 3 is a conceptual view illustrating categories and sub-categories.

FIG. 3 is a conceptual view illustrating categories and sub-categories of each category. For example, if the contents are a music file, the categories include 'Artist', 'Title', 'Mood', 'Genre', and 'Album', and the category 'Artist' includes sub-categories 'Artist A', 'Artist B', . . . , and 'Artist Z'. The sub-category 'Artist A' indicates artists or artist groups whose names begin with the letter 'A'. The 'Artist A' sub-category includes individual files such as 'Song #1', 'Song #2', . . . , and 'Song #n'.

The UI generator 130 adds a UI to an image output from the multimedia function unit 150, which will be described below. For example, if the multimedia function unit 150 outputs a still image, the UI generator 150 generates a UI including the still image.

Figure 4:
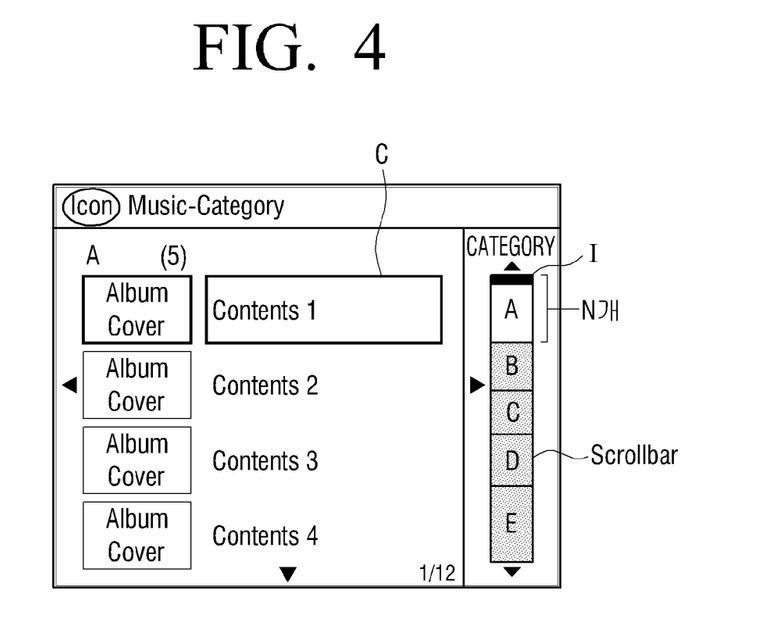
FIG. 4 is a view illustrating a user interface (UI) including a scroll bar with divided areas and a menu area.

Also, the UI generator 130 generates a UI as shown in FIG. 4 in order for a user to search for desired contents from the stored contents.

Referring to FIG. 4, the UI generator 130 generates a UI including a menu area where a list of contents such as contents 1, contents 2, etc is displayed for each sub-category (sub-category A, sub-category B, etc), and a scroll bar where information of the sub categories is displayed. The list of contents is displayed along with a thumbnail of respective contents in the menu area. The thumbnail may be a cursor photo of an album or a photo stored by a user.

In particular, the UI generator 130 divides the scroll bar into a plurality of areas A, B, . . . , Z corresponding the number of sub-categories, and the respective areas A, B, . . . , Z display information of the respective sub-categories Sub-category A, Sub-category B, . . . . Accordingly, the areas A, B, . . . , Z displayed on the scroll bar may be a list of sub-categories.

The sub-category information includes the amount of contents or the number of contents belonging to each sub-category and the relative position of the cursor C displayed on the menu area. The size of each area A, B, . . . , Z changes depending on the amount of contents, and the relative position of the cursor C is indicated by the indicator I on the scroll bar.

Figure 5:
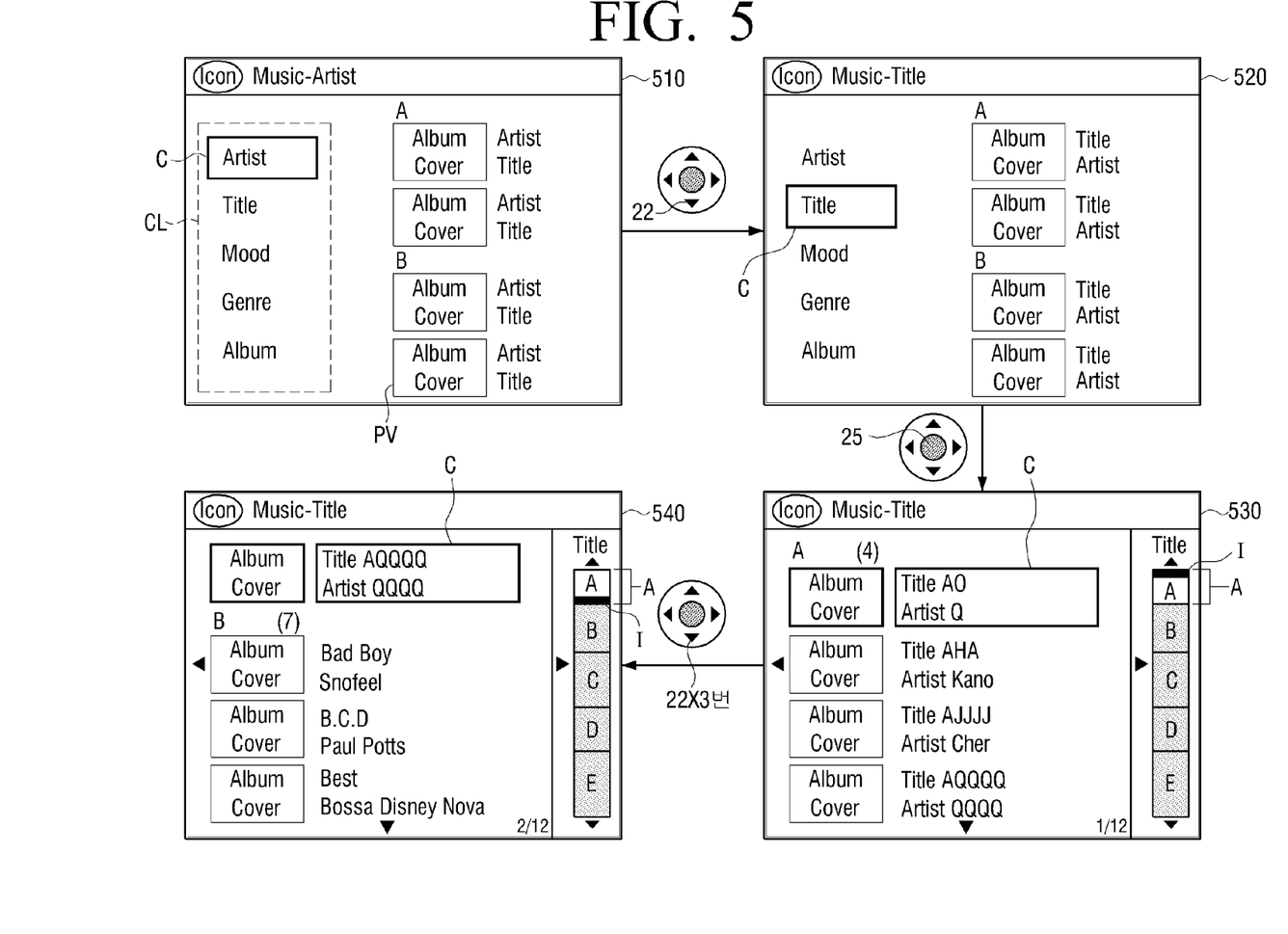
FIG. 5 is a view provided to explain cursor movement on a list of contents and cursor movement between the list of contents and the scroll bar.

FIG. 5 is a view provided to explain cursor movement on a list of contents and cursor movement between the list of contents and the scroll bar.

Referring to FIG. 5, if a user selects a menu mode by manipulating the user input unit 110, the UI generator 130 generates a main UI 510. The main UI 510 includes a category list (CL) and a preview area (PV) of each category. On the main UI 510 a cursor C is initially placed over the category 'Artist' which is located at an uppermost position. Accordingly, the preview area (PV) displays a preview relating to 'Artist', for example, an album cover photo, artiest, and title.

If the user presses the down button 22, the UI generator 130 generates a UI 520 where the cursor C is moved to the category 'Title' located under 'Artist'. If the user presses the selection button 25, the UI generator 130 generates a UI 530 including a scroll bar which displays information of sub-categories of the selected category 'Title' and a menu area which displays a list of contents for each sub-category.

Referring to the UI 530, the category 'Title' includes sub-categories 'Title A', 'Title B', . . . , 'Title Z'. The sub-category 'Title A' relates to titles beginning with the letter 'A'. Accordingly, the scroll bar of the UI 530 is divided into areas A to Z, and the menu area displays a list of contents (Title AO, Title THA, Title AJJJ, Title AQQQQ, etc) corresponding to the area 'A' i.e. 'Title A' and a list of contents corresponding to 'Title B' in sequence, and also displays the number of contents corresponding to 'Title A' (e.g. '(4)').

The size of each area A to Z displayed on the scroll bar of the UI 530 corresponds to an amount of each sub-category (Title A, Title B, . . . , Title Z). If it is difficult to display all of the areas A to Z on a single screen, the UI generator 530 displays all or a part of the areas of the scroll bar on the UI.

The cursor C is placed over the first contents 'Title AO' of the list of contents corresponding to 'Title A'. Accordingly, the UI generator 130 displays the indicator I on the uppermost end of the area 'A' corresponding to the sub-category 'Title A' to indicate a relative position of the content 'Title AO' where the current cursor C is placed.

If the user presses the down button 22 three times after the display of the UI 530, the UI generator 130 generates a UI 540 where the cursor C is placed over 'Title AQQQQ' in the list of contents. Accordingly, the indicator I is displayed on the lowermost end of the area 'A' corresponding to the sub-category 'Title A'. That is, navigation among the contents displayed on the menu is possible by manipulating the up button 21 or the down button 22 on the 5-way key.

Figure 6:
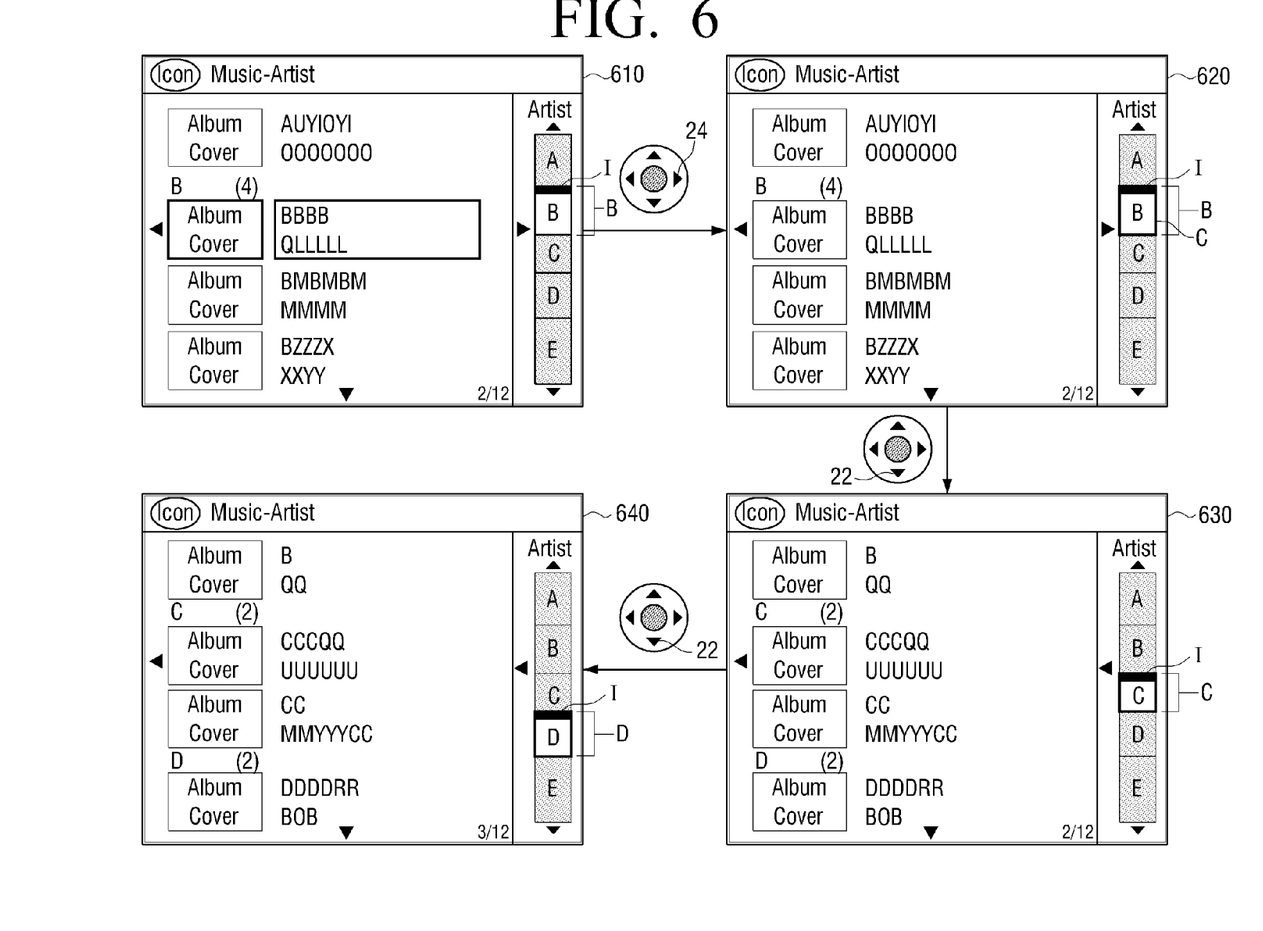
FIG. 6 is a view provided to explain cursor movement on divided areas of the scroll bar.

FIG. 6 is a view provided to explain cursor movement on the divided areas of the scroll bar.

FIG. 6 illustrates a UI 610 generated if the user selects the category 'Artist' on the UI 510. In the UI 610, the scroll bar is divided into areas A to Z and only areas A to E of them are visible. The category 'Artist' includes sub-categories 'Artist A', 'Artist B', . . . , 'Artist Z'. Accordingly, the area A corresponds to the sub category 'Artist A', and the area B to the sub-category 'Artist B'. The sub-category 'Artist A' includes artists whose names begin with the letter A'. The cursor C is placed over the artist 'BBBB' which belongs to the sub-category 'Artist B'. Accordingly, the indicator I indicating the relative position of the cursor C is displayed on the area B.

If the user presses the right button 24 after the display of the UI 610, the UI generator 130 generates a UI 620 where the cursor C moves from the artist 'BBBB' on the menu area to the area B of the scroll bar. That is, it is possible to navigate between the menu area and the scroll bar by manipulating the right button 24 or the left button 23 of the 5-way key.

If the user presses the down button 22 after the display of the UI 620, the UI generator 130 generates a UI 630 where the cursor C moves from the area B to the area C. Accordingly, the menu area displays a list of contents belonging to the sub-category 'Artist C' corresponding to the area C', i.e., displays a list of artist whose names begin with the letter 'C' and the number of these contents.

If the user presses the down button 22 after the display of the UI 630, the UI generator 130 generates a UI 640 where the cursor C moves from the area C to the area D. Accordingly, the menu area displays a list of contents belonging to the sub-category 'Artist D' corresponding to the area D, i.e., displays a list of artists whose names begin with the letter D and the number of these contents.

FIGS. 7A to 7E are views provided to explain a list of contents which is displayed differently according to which category is selected on the UI 510 of FIG. 5.

Figure 7A:
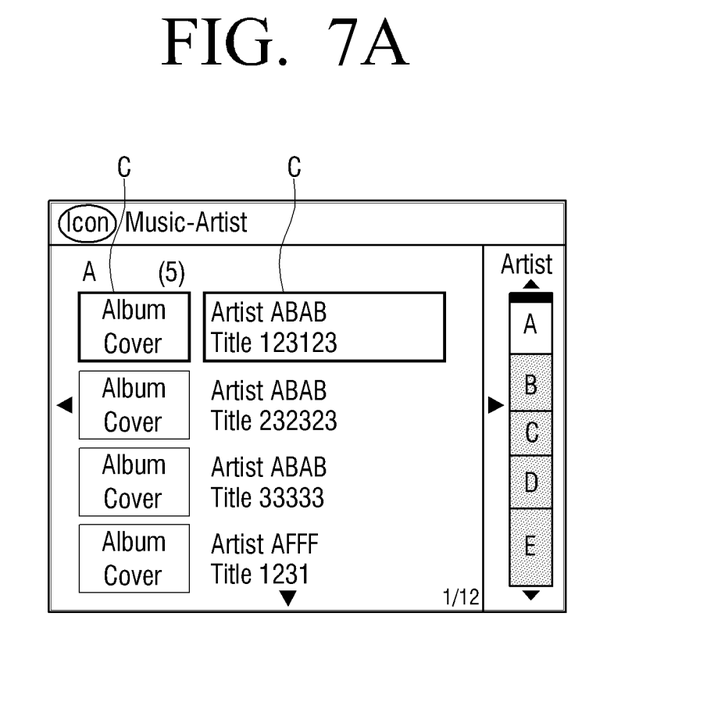
FIGS. 7A to 7E are views provided to explain a list of contents which is displayed differently according to which category is selected through the UI of FIG. 5.

Referring to FIG. 7A, if the category 'Artist' is selected on the UI 510, the scroll bar is divided into a plurality of areas which are arranged in alphabetical order of the artist. For example, the scroll bar is divided into areas 'A to Z'. Of course, the areas may be assigned Korean characters 'ㄱ to ㅎ' or '1 to n'. In the case of song, the area 'ㄱ' means a group of artists whose names begin with the letter 'ㄱ', and the area '1' means a group of artists whose names begin with '1'. A list of contents is displayed on the menu area and a single contents item includes an artist name and a music title which are displayed on an upper end and a lower end respectively.

Figure 7B:
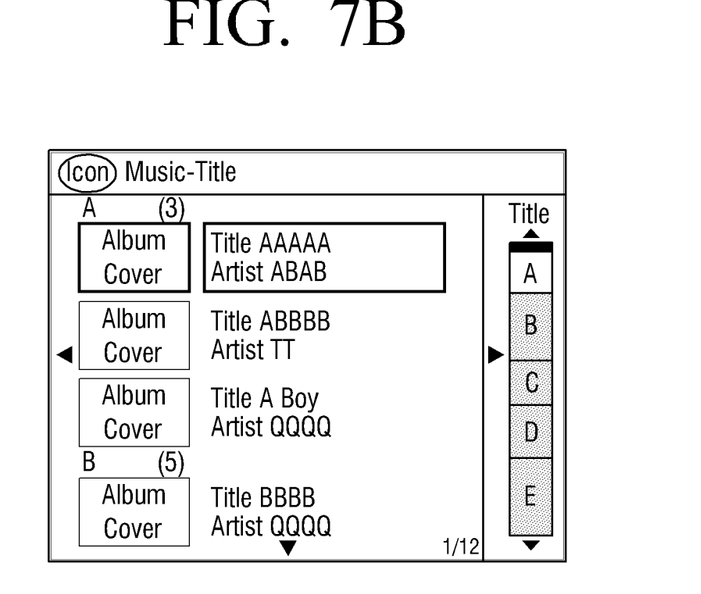

Referring to FIG. 7B, if the category 'Title' is selected on the UI 510, the scroll bar is divided into a plurality of areas which are arranged in alphabetical order of the music title. For example, the scroll bar is divided into the areas 'A to Z'. The area 'A' corresponds to the sub-category 'Title A' and means a group of music titles beginning with the letter 'A'. A list of contents is displayed on the menu area and a single contents item includes a music title and an artist name which are displayed on an upper end and a lower end respectively.

Figure 7C:
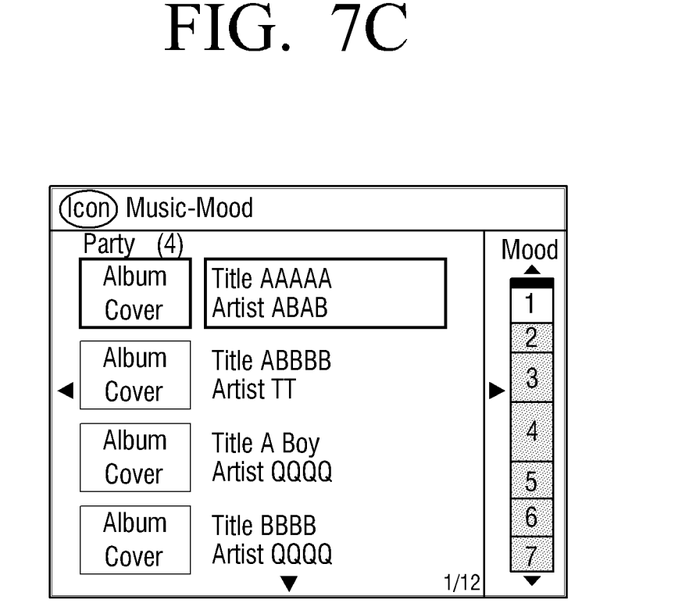

Referring to FIG. 7C, if the category 'Mood' is selected on the UI 510, the scroll bar is divided into a plurality of areas '1-n' which correspond to types of mood. That is, the areas correspond to sub-categories of the category 'Mood'. A list of contents for each type of mood is displayed on the menu area and a single contents item includes a music title and an artist name which are displayed on an upper end and a lower end respectively.

Figure 7D:
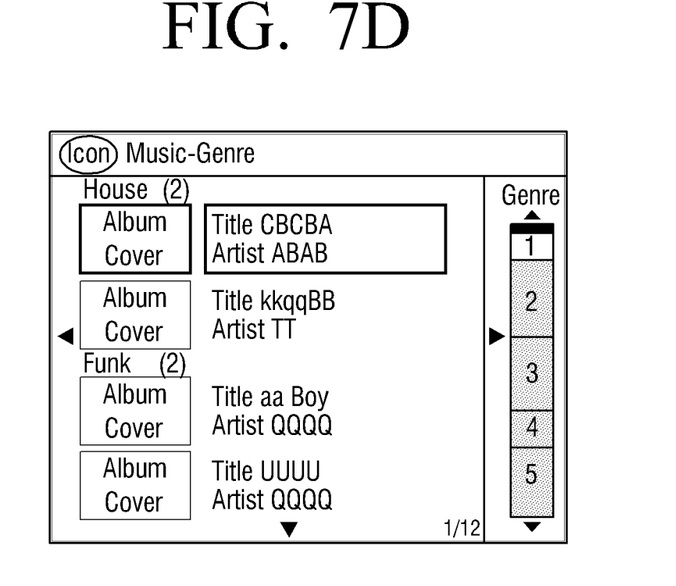

Referring to FIG. 7D, if the category 'Genre' is selected on the UI 510, the scroll bar is divided into a plurality of areas '1-n' which correspond to types of 'Genre'. A list of contents for each type of genre is displayed on the menu area. A single contents item includes a music title and an artist name which are displayed on an upper end and a lower end respectively.

Figure 7E:
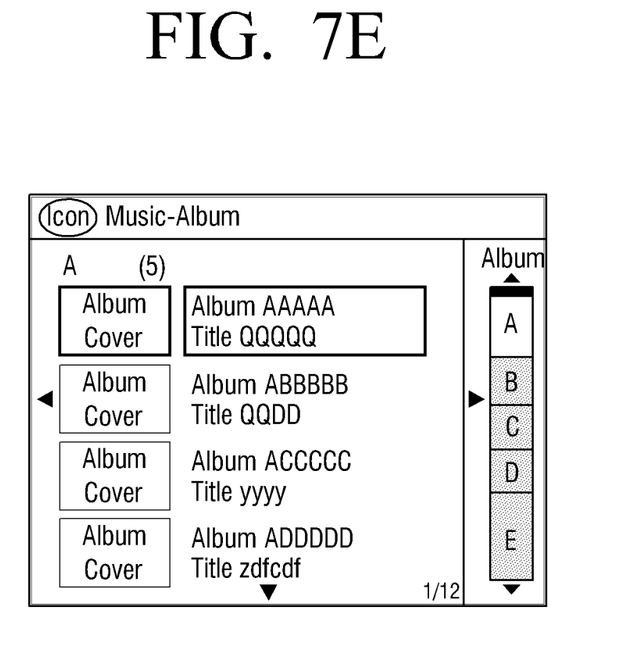

Referring to FIG. 7E, if the category 'Album' is selected on the UI 510, the scroll bar is divided into a plurality of areas 'A to Z', and the area 'A' means a sub-category 'Album A', that is, a group of albums beginning with the letter 'A'. A list of contents for each album is displayed on the menu area and a single contents item includes an album title and a music title which are displayed on an upper end and a lower end respectively.

Figure 8:
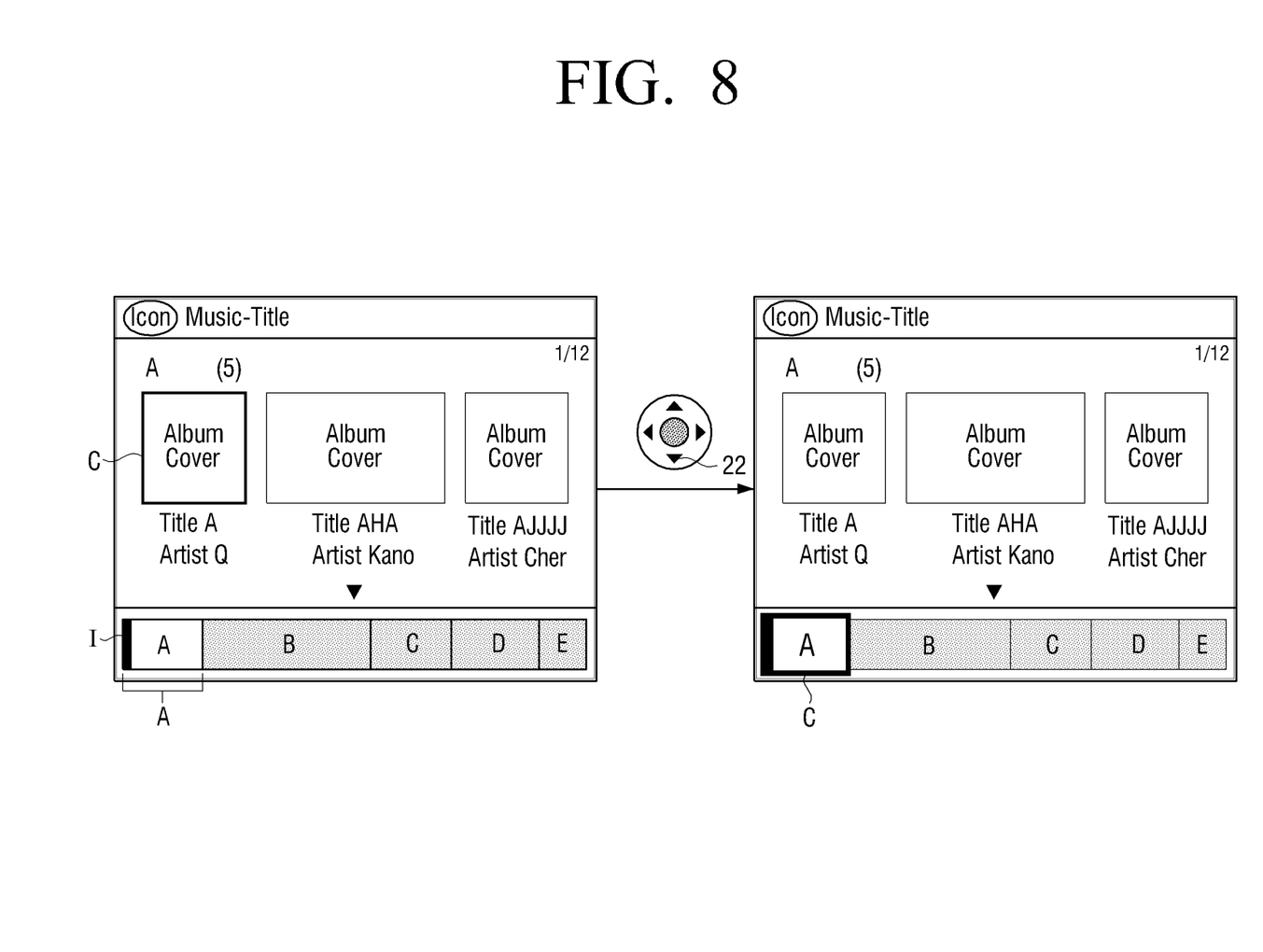
FIG. 8 is a view illustrating a UI of a horizontal layout.

FIG. 8 illustrates an example of an UI with a horizontal layout. Referring to FIG. 8, a scroll bar is located on a lower end of the menu area and an indicator I is displayed on a corresponding area of the scroll bar. A cursor 'C' is placed over contents having a music title 'A'. If a user selects the down button 22, the UI generator 130 moves the cursor 'C' from the menu area to the area 'A' of the scroll bar. The scroll bar may be located on the upper end or the left side instead of the lower end of the menu area.

Referring back to FIG. 1, the display unit 140 displays various UIs generated by the UI generator 130.

The multimedia function unit 150 performs a general function of the digital device such as a function of replaying contents such as a movie, a still picture, music, or text.

The controller 160 controls general operations of the digital device according to a stored control program. The controller 160 controls operation of the multimedia function unit 150 according to a user manipulation input through the user input unit 110. Also, the controller 160 controls the UI generator 130 to display a UI conforming to the user manipulation on the display unit 140. A UI conforming to the user manipulation is one of the UIs mentioned in the above embodiments.

Figure 9:
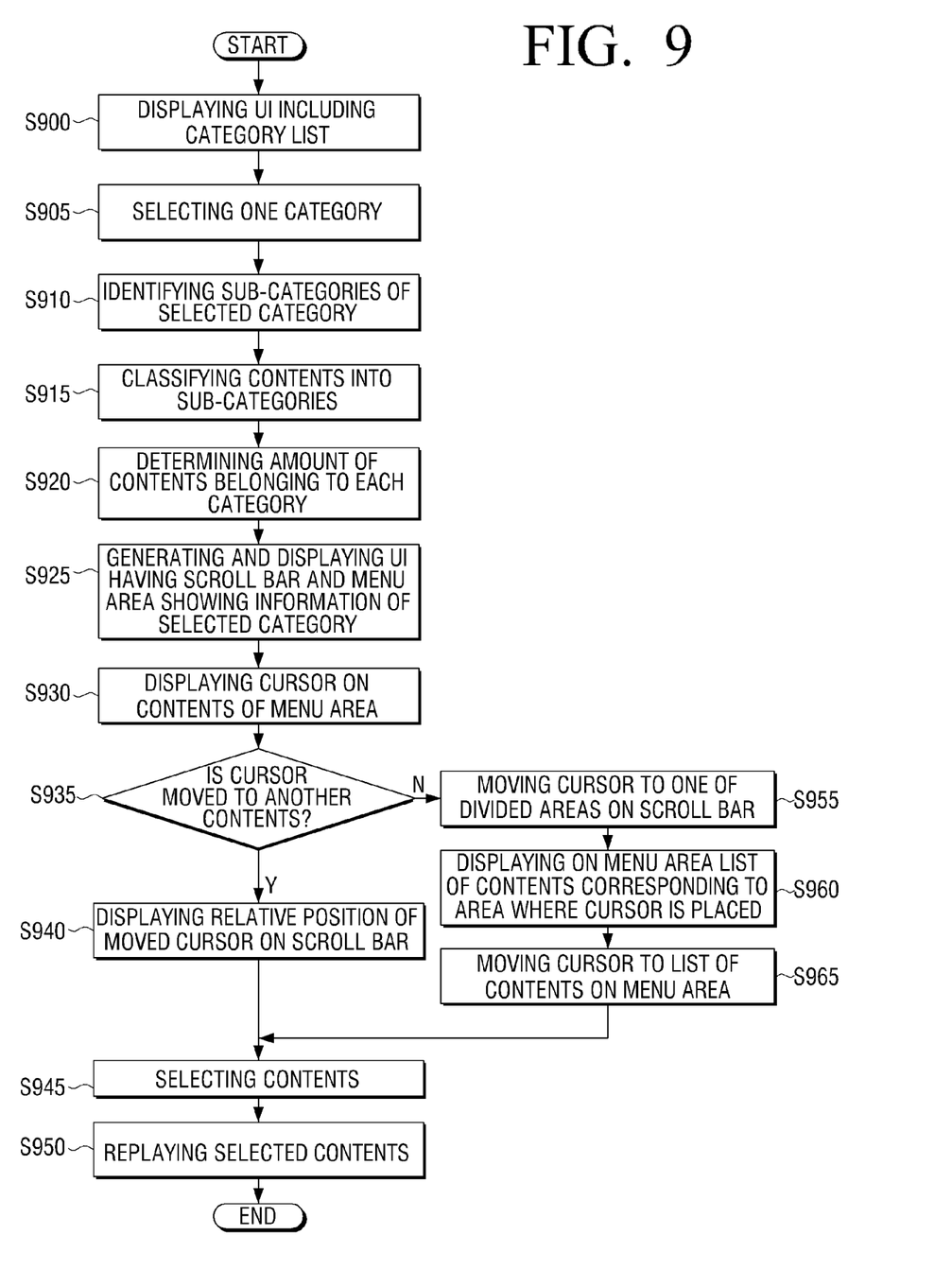
FIG. 9 is a flowchart illustrating a method of controlling a UI of a digital device according to an exemplary embodiment of the present invention.

FIG. 9 is a flowchart illustrating a method of controlling a UI of a digital device according to an exemplary embodiment of the present invention.

Referring to FIGS. 1 to 9, if a user selects a menu mode by manipulating the user input unit 110, the controller 160 controls the UI generator 130 and the display unit 140 to generate and display the main UI 510 including a list of categories (S900).

If the user selects a category from the categories displayed on the main UI 510 using the user input unit 110 (S905), the controller 160 identifies the sub-categories of the selected category from the storage unit 120 (S910). If the category 'Title' is selected in operation S905, the sub categories include 'Title A', 'Title B', . . . , 'Title Z'.

The controller 160 classifies the contents stored in the storage unit 120 into the identified sub-categories (S915). For example, the controller 160 extracts the contents having a title beginning with the letter 'A' from the stored plurality of music contents and maps it with 'Title A'.

After the operation S915, the controller 160 determines the amount (or the number) of contents for each sub-category (S920). For example, the controller 160 determines the number of contents having a title beginning with the letter 'A'.

The controller 160 controls the UI generator 130 and the display unit 140 to generate and display a UI (e.g., UI 530 of FIG. 5) having a scroll bar and a menu area showing information on the category selected in operation S905 (S925). More specifically, the information on the category displayed on the scroll bar includes the amount of contents belonging to each sub-category determined in operation S920 and a relative position of the cursor on the list of contents of the menu area. The UI generator 130 divides the scroll bar to correspond to the sub-categories identified in operation S910, and changes the sizes of the divided areas in proportion to the amount of contents belonging to the sub-categories identified in operation S920.

Also, the controller 160 controls the UI generator 130 to place the cursor "C" over one of the listed contents on the menu area (S930).

If the user moves the cursor to another contents by manipulating the user input unit 110 (S935), the controller 160 controls the UI generator 130 to indicate the relative position of the moved cursor through the scroll bar (S940). For example, if the cursor is moved from the position shown in the UI 530 to the position shown in the UI 540, the controller 160 controls the UI generator 130 to move the indicator I according to change in the position of the cursor C. Accordingly, the multimedia function unit 150 reads out the selected contents file from the storage unit 120 and processes it to reproducible data.

If the user selects contents to replay by selecting the selection button 25 (S945), the controller 160 identifies contents where a current cursor is placed and controls the multimedia function unit 150 to replay the identified contents (S950).

If the user moves the cursor C from the menu area to one area displayed on the scroll bar by manipulating the user input unit 110 (S955), the controller 160 identifies a sub-category corresponding to the area where the current cursor C is placed, identifies a list of contents belonging to the identified sub-category from the storage unit 120, and controls the UI generator 130 to display the identified list of contents on the menu area (S960).

If the user selects the left button 23, the controller 160 moves the cursor C placed over a certain area of the scroll bar to a list of contents on the menu area (S965). If the user selects desired contents to relay by manipulating the 5 way-key (S945), the controller 160 performs the operation S950.

According to the exemplary embodiment of the present invention, a plurality of contents is displayed by categories or sub-categories and the scroll bar is divided into areas to provide information of each sub-category. Accordingly, the user knows the amount of contents belonging to each sub-category through the divided areas of the scroll bar. The user is able to obtain a lot of information through the scroll bar.

It is possible to navigate the scroll bar by allowing the user to select one of the areas divided on the scroll bar or allowing the cursor to be placed over each area. Therefore, it is possible to address the problem where a user cannot directly manipulate the scroll bar and also it is possible for the user to get access to desired contents more rapidly and more effectively even in a low grade CE device.

Also, the present invention allows the cursor to move between the scroll bar and the menu area which are displayed on the UI so that the user can search for desired contents more conveniently using an interface even if the interface has a restricted input method such as in the 5 Way key.

The scroll bar of the present invention is not limited to the case where the contents are displayed for each category, and the present invention is applicable to a scroll bar provided by web page or various applications. The present invention is applicable to any apparatus which is capable of displaying or replaying digital contents or any apparatus that contains a play list. Examples of the apparatus are a home appliance having a function of replaying a stored medium such as a TV, a digital video recorder (DVR), a digital video disk player (DVDP), an MP3 player, and a digital camera.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A digital device comprising:
   a user interface (UI) generator which generates a UI;
   a controller which controls the UI generator to generate a UI which includes a menu area to display a list of contents for each sub-category of one or more sub-categories and a scroll bar to display information on respective sub-categories of the one or more sub-categories; and
   a display unit which displays the generated UI,
   wherein the UI generator divides the scroll bar to generate a plurality of areas corresponding to the respective sub-categories, and
   when one of the plurality of areas corresponding to the respective sub-categories is selected by a user input, the controller controls a cursor to be positioned on one of contents included in the sub-category corresponding to the selected area,
   wherein the cursor is moved between the scroll bar and the menu area corresponding to the user input, and a selected portion of the divided scroll bar area and a selected portion of the menu area are highlighted when the cursor is placed on the respective selective portions.

2. The digital device as claimed in claim 1, wherein the UI generator displays the information on the respective sub-categories in the corresponding areas.

3. The digital device as claimed in claim 2, further comprising a storage unit which stores the contents,
   wherein the controller classifies the stored contents into the one or more sub-categories and determines an amount of contents belonging to each of the one or more sub-categories, and the UI generator changes a size of each divided area based on the determined amount of contents.

4. The digital device as claimed in claim 2, further comprising a user input unit which controls a moving direction of the cursor to select one of the divided areas,
   wherein the UI generator displays a list of contents belonging to the respective sub-category corresponding to the selected area on the menu area.

5. The digital device as claimed in claim 2, wherein the UI generator displays on the scroll bar an indicator that indicates a relative position of the contents selected from the displayed list of contents.

6. The digital device as claimed in claim 5, wherein the controller identifies the respective sub-category to which the selected contents belong,
    wherein the UI generator displays the indicator on an area of the scroll bar corresponding to the identified respective sub-category.

7. The digital device as claimed in claim 2, wherein the UI generator displays all or a part of the divided areas of the scroll bar on the UI.

8. The digital device as claimed in claim 1, wherein the scroll bar is located on one of an upper end, a lower end, a left side and a right side of the menu area.

9. The digital device as claimed in claim 1, wherein the contents are at least one of a still picture file, a music file, a motion picture file, and a text file.

10. A method of controlling a user interface (UI) of a digital device, the method comprising:
    generating a user interface;
    displaying a list of contents for each sub-category of one or more sub-categories in a menu area of the UI;
    displaying a scroll bar which displays information on respective sub-categories of the one or more sub-categories on the UI,
    dividing the scroll bar to generate a plurality of areas corresponding to the respective sub-categories, and
    selecting one of the scroll bar and the menu area by using a cursor which is movable between the scroll bar and the menu area;
    wherein when one of the plurality of areas corresponding to the respective sub-categories is selected by a user input, controlling a cursor to be positioned on one of contents included in the sub-category corresponding to the selected area, and
    a selected portion of the divided scroll bar area and a selected portion of the menu area are highlighted when the cursor is placed on the respective selective portions.

11. The method as claimed in claim 10, wherein the displaying of the scroll bar displays information on the respective sub-categories in the corresponding areas.

12. The method as claimed in claim 11, further comprising:
    storing the contents; and
    classifying the stored contents into the one or more sub-categories and determining an amount of contents belonging to each of the one or more sub-categories,
    wherein the displaying of the scroll bar changes a size of each divided area based on the determined amount of contents.

13. The method as claimed in claim 11, further comprising:
    selecting one of the divided areas; and
    displaying a list of contents belonging to the respective sub-category corresponding to the selected area on the menu area.

14. The method as claimed in claim 11, further comprising displaying on the scroll bar an indicator that indicates a relative position of the contents selected from the list of contents displayed on the menu area.

15. The method as claimed in claim 14, further comprising identifying the respective sub-category to which the selected contents belong,
    wherein the indicator is displayed on an area of the scroll bar corresponding to the identified respective sub-category.

16. The method as claimed in claim 11, wherein all or a part of the divided areas of the scroll bar are displayed on the UI.

17. The method as claimed in claim 10, wherein the scroll bar is located on one of an upper end, a lower end, a left side or a right side of the menu area.

18. The method as claimed in claim 10, wherein the contents are at least one of a still picture file, a music file, a motion picture file, and a text file.

* * * * *